US012309037B2

(12) United States Patent
Cox et al.

(10) Patent No.: US 12,309,037 B2
(45) Date of Patent: May 20, 2025

(54) DETERMINING COMMUNICATION WINDOWS

(71) Applicants: Skylar Cox, North Logan, UT (US); Justin Whitaker, Logan, UT (US); John Humble, Logan, UT (US); Greg Droge, Nibley, UT (US)

(72) Inventors: Skylar Cox, North Logan, UT (US); Justin Whitaker, Logan, UT (US); John Humble, Logan, UT (US); Greg Droge, Nibley, UT (US)

(*) Notice: Subject to any disclaimer, the term of this patent is extended or adjusted under 35 U.S.C. 154(b) by 286 days.

(21) Appl. No.: 18/117,276

(22) Filed: Mar. 3, 2023

(65) Prior Publication Data
US 2023/0283528 A1  Sep. 7, 2023

Related U.S. Application Data

(60) Provisional application No. 63/316,830, filed on Mar. 4, 2022.

(51) Int. Cl.
H04L 41/14     (2022.01)
H04B 7/185     (2006.01)
H04W 74/00    (2009.01)

(52) U.S. Cl.
CPC ......... *H04L 41/145* (2013.01); *H04B 7/1858* (2013.01); *H04W 74/006* (2013.01)

(58) Field of Classification Search
CPC ... H04L 41/145; H04B 7/1858; H04W 74/006
See application file for complete search history.

(56) References Cited

U.S. PATENT DOCUMENTS 10,762,458 B1 *  9/2020  Augenstein .......... B64G 1/1021
2019/0075485 A1 *  3/2019  Xenakis ................ H04W 28/20

* cited by examiner

Primary Examiner — Samina F Choudhry

(57) ABSTRACT

For determining a communication window is disclosed, a method generates a communication graph that includes backbone nodes, dummy nodes, data collection nodes, downlink nodes, crosslink send nodes, and crosslink receive nodes. The backbone nodes, the data collection nodes, the downlink nodes, the crosslink-transmit nodes, and the crosslink-receive nodes are connected by one of a homogenous edge between nodes of a same type and transition edges between nodes of a different type. The method determines access windows for downlink communications and crosslink communications using the communication graph. The method selects access windows based on a task graph generated from the communication graph. The method communicates from a given satellite within the selected access windows.

17 Claims, 11 Drawing Sheets

200 

```
┌─────────────────────────┐
│   Access Windows        │
│        201              │
├─────────────────────────┤
│  Temporal Constraints   │
│        203              │
├─────────────────────────┤
│   Spatial Constraints   │
│        205              │
├─────────────────────────┤
│        Tasks            │
│        207              │
├─────────────────────────┤
│   Computational Data    │
│        209              │
├─────────────────────────┤
│        Scores           │
│        211              │
├─────────────────────────┤
│        Costs            │
│        213              │
├─────────────────────────┤
│     MILP Problem        │
│        215              │
├─────────────────────────┤
│     Optimal Path        │
│        217              │
├─────────────────────────┤
│   Maximum Slew Rate     │
│        219              │
└─────────────────────────┘
```

FIG. 2A

| April | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| Edges 20/6 | 0 | 0 | 0 | 0 | 0 | -1 | 0 | 0 | 0 | 0 | 0 | 0 | 0 | 0 | 0 | 0 | 0 | 0 | 0 | -1 | 0 | 0 | 0 | 0 |
| Edges 21/5 | 0 | 0 | 0 | 0 | -1 | 0 | 0 | 0 | 0 | 0 | 0 | 0 | 0 | 0 | 0 | 0 | 0 | 0 | 0 | 0 | -1 | 0 | 0 | 0 |

FIG. 3C

DETERMINING COMMUNICATION WINDOWS

CROSS-REFERENCE TO RELATED APPLICATIONS

This application claims priority to U.S. Provisional Patent Application No. 63/316,830 entitled "DETERMINING COMMUNICATION WINDOWS" and filed on Mar. 4, 2022 for Skylar Cox, which is incorporated herein by reference.

FIELD

The subject matter disclosed herein relates to determining downlink and crosslink communication access windows.

BACKGROUND

Description of the Related Art

Satellites communicate data to other satellites and to ground stations.

BRIEF SUMMARY

A method of determining a communication window is disclosed. The method generates a communication graph that includes backbone nodes, dummy nodes, data collection nodes, downlink nodes, crosslink send nodes, and crosslink receive nodes, wherein the backbone nodes, the data collection nodes, the downlink nodes, the crosslink-transmit nodes, and the crosslink-receive nodes are connected by one of a homogenous edge between nodes of a same type and transition edges between nodes of a different type. The method determines access windows for downlink communications and crosslink communications using the communication graph. The method selects access windows based on a task graph generated from the communication graph. The method communicates from a given satellite within the selected access windows.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2A is a schematic block diagram illustrating one embodiment of planning data;

FIG. 3C is a matrix illustrating one embodiment of an edge matrix;

DETAILED DESCRIPTION

Figure 1A:
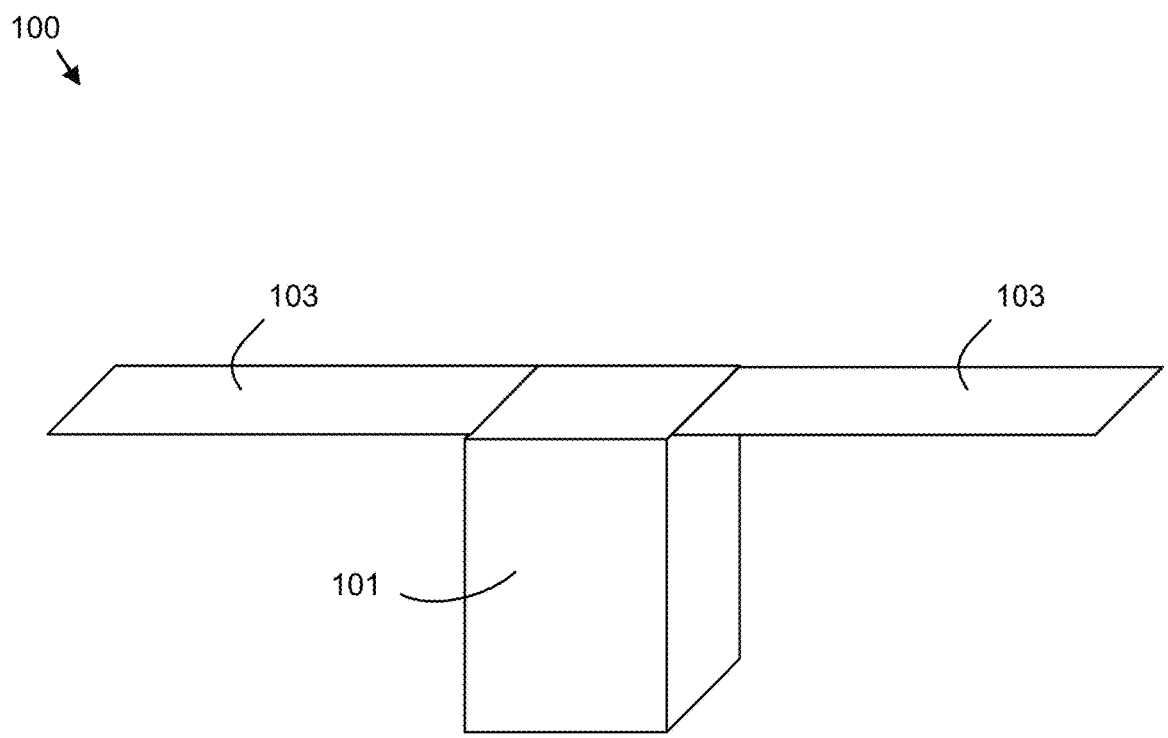
FIG. 1A is a perspective drawing illustrating one embodiment of a satellite.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing computer readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in computer readable code and/or software for execution by various types of processors. An identified module of computer readable code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of computer readable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a computer readable signal medium or a computer readable storage medium. The computer readable storage medium may be a storage device storing the computer readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable code embodied therein, for example, in baseband or as part of a carrier wave. Such a propagated signal may take any of a variety of forms, including, but not limited to, electro-magnetic, optical, or any suitable combination thereof A computer readable signal medium may be any storage device that is not a computer readable storage medium and that can communicate, propagate, or transport a program for use by or in connection with an instruction execution system, apparatus, or device. Computer readable code embodied on a storage device may be transmitted using any appropriate medium, including but not limited to wireless, wire line, optical fiber cable, Radio Frequency (RF), etc., or any suitable combination of the foregoing.

Computer readable code for carrying out operations for embodiments may be written in any combination of one or more programming languages, including an object-oriented programming language such as Python, Ruby, R, Java, Java Script, Smalltalk, C++, C sharp, Lisp, Clojure, PUP, or the like and conventional procedural programming languages, such as the "C" programming language or similar programming languages. The computer readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by computer readable code. These computer readable code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The computer readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable code.

Cox, Skylar et al., "A Two-Layer Constellation Scheduling Approach for Imaging and Communication" is incorporated herein by reference.

Satellite constellations are often used to conduct operations in space. While many of the individual satellites are shrinking in mass, volume, and cost, the satellite constellations continue to grow in numbers, capability, and sophistication, requiring increased levels of automation to properly cooperate in accomplishing their mission objectives. As the numbers of satellite in a satellite constellation grow, the problem complexity of coordinating operations compounds due to the spatial and temporal dependencies present within the satellite constellation's operational environment, as well as from the limitations of individual satellites such as slew agility and memory resources available during flight.

The embodiments efficiently determine communication access widows for downlink communications and crosslink communications for a satellite constellation using both a communication graph and a task graph. The graphs may be used to plan image collection tasks, the scheduling of ground stations for data links, and the coordination of satellite within the satellite constellation for crosslinking data.

The communication graph and/or task graph may be a directed acyclic graph (DAG) with a time-sequenced series of task fulfillment opportunities where the flow is constrained in the direction of elapsing time. A bi-level framework for scheduling downlink communications and image collection may be employed. In one embodiment, the communication graph considers the scheduling of ground stations using heuristics for communications costs obtained from rapid search over the communication graph. The task graph may schedule the data collection tasks assuming the downlink communications are fixed. The embodiments may use a mixed integer linear program (MILP) that only uses the communication graph indirectly to determine feasible transitions.

Because downlinking does not occur instantaneously, the time the satellite is in communication with the ground station as well as the data transfer rate is considered. The embodiments use the edge length between nodes to determine the time available for the downlink operation and then multiplies it by the downlink rate to arrive at the total change in onboard memory. The consideration of downlinking and data management, including storage capacity constraints, significantly slows down the MILP optimization due to the introduction of cross-schedule dependencies between satellites in the constellation, e.g., if one satellite is in communication with the ground station, then no other satellite can be in communication with that same ground station.

The description of elements in each figure may refer to elements of proceeding figures. Like numbers refer to like elements in all figures, including alternate embodiments of like elements.

FIG. 1A is a perspective drawing illustrating one embodiment of a satellite 100. In the depicted embodiment, the satellite 100 includes a body 101 and solar arrays 103.

Figure 1B:
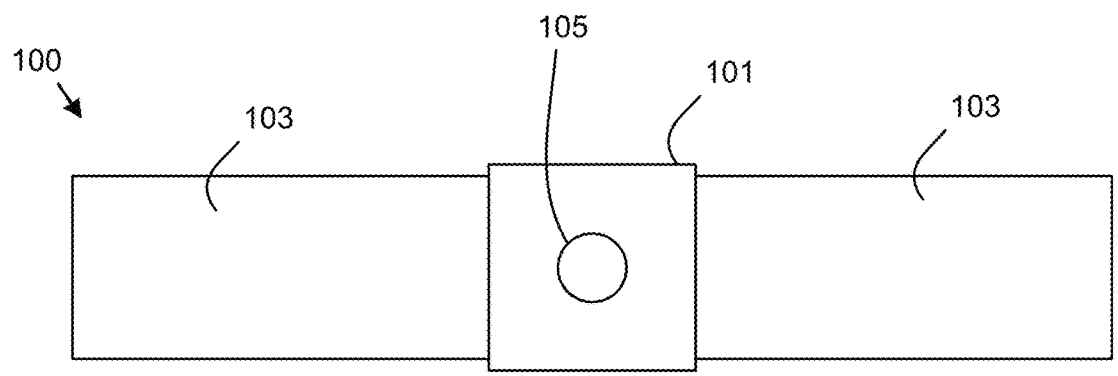
FIG. 1B is a front view drawing illustrating one embodiment of a satellite.

FIG. 1B is a front view drawing illustrating one embodiment of the satellite 100. In the depicted embodiment, a sensor 105 is shown. The sensor 105 may be oriented towards one or more targets such as objects on a planet below, astronomical objects, and the like. In one embodiment, the satellite 100 is oriented or slewed to direct the sensor 105 towards the target.

Figure 1C:
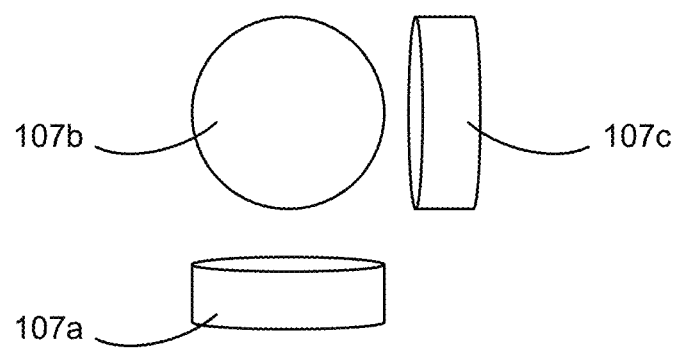
FIG. 1C is a perspective drawing illustrating one embodiment of a reaction wheels.

FIG. 1C is a perspective drawing illustrating one embodiment of a reaction wheels 107a-c. The reaction wheels 107 may slew the satellite 100 about one or more corresponding axes of the satellite 100. The reaction wheels 107 may slew the satellite 100 up to a maximum slew rate $t_{slew,max}$.

Figure 1D:
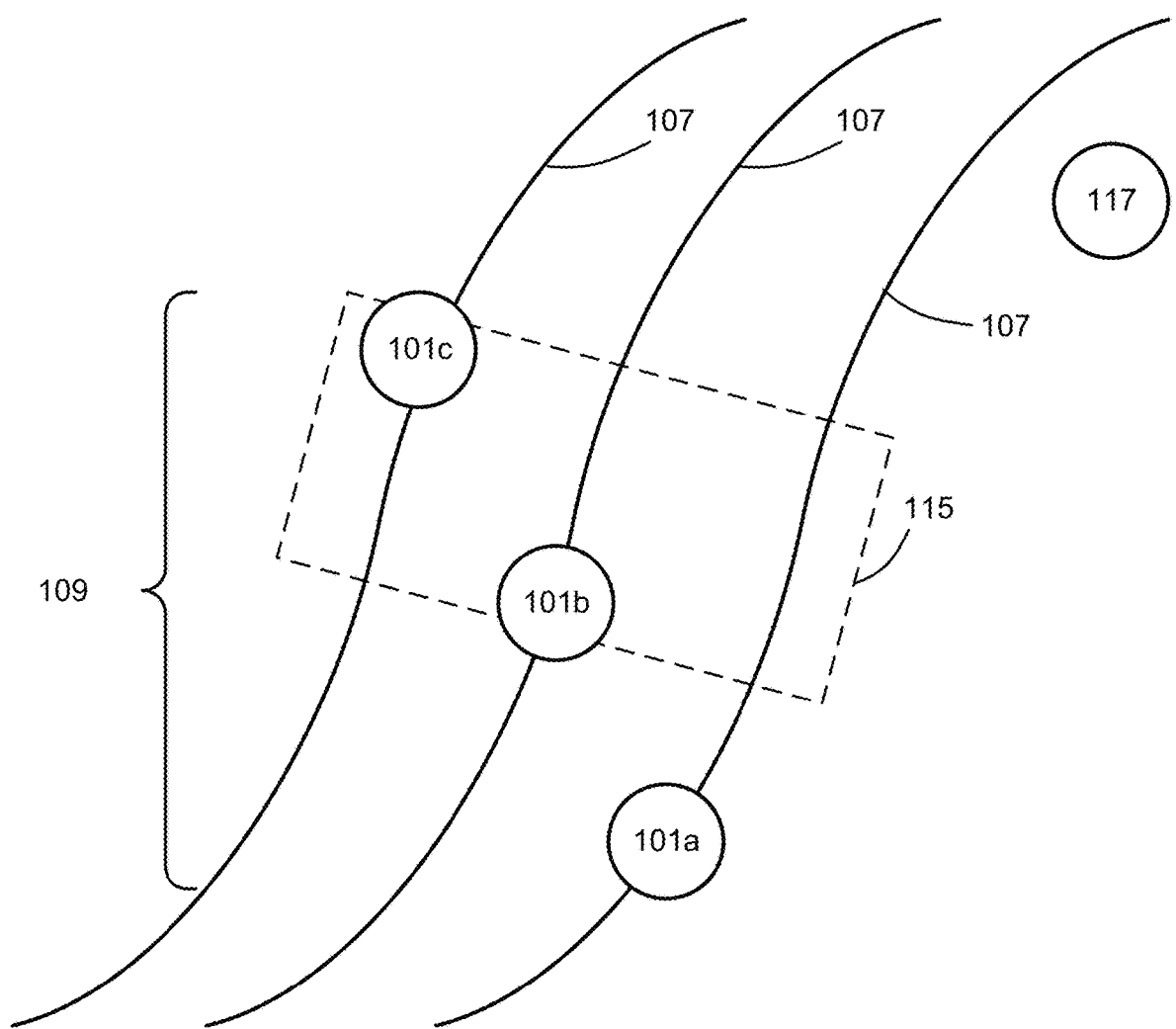
FIG. 1D is a perspective drawing illustrating one embodiment of a satellite in orbit.

FIG. 1D is a schematic diagram illustrating one embodiment of a satellite constellation 109. In the depicted embodiment, a plurality of satellites 100 are shown traversing orbital tracks 107. The satellites 100 may be orbiting in the satellite constellation 109 to perform a mission objective such as capturing data at a target 115. Capturing data and other tasks may include but is not limited to gravitational mapping, capturing images, capturing sensor data, making measurements, communicating with ground stations 117 on the ground, communicating with another satellite 100, and the like.

FIG. 2A is a schematic block diagram of planning data 200. The planning data 200 may be organized as a data structure in a memory. The access windows 201 may specify opportunities for downlink communications between a satellite 100 and at least one ground station 117. In one embodiment, the access windows 201 specify opportunities for crosslink communications between satellites 100.

The access windows 201 may depend upon temporal constraints 203 and spatial constraints 205. The temporal constraints 203 define time windows in which a task 207 should be completed. A task 207 may be collecting data, capturing images, and the like. The spatial constraints 205 consider restrictions on the elevation angle between the target 115 and satellite 100 for image quality, restriction on the azimuth angle to avoid obstructions, as well as lighting constraints (expressed as sun-elevation angle constraints). Given a satellite trajectory and assuming no orbital changes are considered by the planner, the spatial constraints 205 are mapped to additional temporal constraints 203, combined to provide time windows in which each satellite 100 may access each target 115 and/or ground station 117. Scores 211 and costs 213 are calculated for task nodes and edges. The MILP problem 215 may be formulated and solved to determine an optimal path 217 for the satellite constellation 109 to perform tasks.

Computational data 209 is used in calculations. The maximum slew rate 219 is shown. Tables 1-9 show embodiments of the computational data. Scores 211 and costs 213 are calculated for task nodes and edges as will be described hereafter.

Table 1 shows counting variables.

TABLE 1

| | |
|---|---|
| $n_s$ | Number of satellites |
| $n_v$ | Number of nodes/vertices |
| $n_e$ | Number of edges |
| $n_g$ | Number of task groups |
| $n_t$ | Number of time steps |
| $n_{g\text{-}cl}$ | Number of crosslink groups |
| $n_{g\text{-}v}$ | Number of visit groups |

Table 2 show graph representation variables.

TABLE 2

| | |
|---|---|
| V | Set of nodes or vertices |
| $v_i$ | Node i, $v_i \in V$ |
| E | Set of edges, $E \subset V \times V$ |
| $e_i$ | Edge i, $e_i \in E$ |
| G | Graph, {V, E} |
| K | Max number of task nodes a task node can connect to |
| N | Max number of nodes per group a task node can connect to |

Table 3 shows optimization variables.

TABLE 3

| | |
|---|---|
| $x_i$ | Integer variable representing flow along edge $e_i$ |
| x | Vector of all xi, $x = [x_1 \ldots x_{n_v}]$ |
| $y_{lk}$ | Memory for satellite l at time $k_{(l}$ |
| $y_{l,\,max}$ | The maximum memory capacity of satellite l |
| y | Vector of all y, $y = [y_1^T \ldots y_{n_s}^T]$ |
| z | All optimization parameters, $z = [x^T y^T]^T$ |

Table 4 shows utility, scoring, and flow constraint parameters.

TABLE 4

| | |
|---|---|
| $u_i$ | utility associated with optimization variable I such as edge utility |
| u | Vector of all $u_i$ |
| D | Incidence matrix |
| B | RHS of flow constrain with one source, one sink, and unit flow |

Table 5 shows group constraint and memory constraint parameters.

TABLE 5

| | |
|---|---|
| $A_g$ | Group constraint matrix |
| $b_g$ | Group constraint right hand side |
| $A_{data}$ | Aggregate data constraint matrix |
| $b_{data}$ | Aggregate RHS vector for the data constraint |
| $A_{cap}$ | Matrix of required transfer time for each file as it applies to each crosslink or downlink window opportunity |
| $A_{tran}$ | Constraint matrix indicating the relationship between edges of a graph that are mutually exclusive to prevent transferring a file via multiple paths from a single node |
| $A_{seq}$ | Sequence constraint matrix that ensures a file is onboard prior to downlinking the file to the ground |
| $b_{cap}$ | Vector of time correlating to the amount of capacity in each crosslink or downlink window (time) |
| $b_{tran}$ | Vector of 1's that ensures a particular file is transferred through one path per source node |
| $b_{prec}$ | Vector of 0's that forces a file to be available onboard a satellite prior to downlinking the file to the ground |

TABLE 5-continued

Table 6 shows crosslink group constraint parameters.

TABLE 6

| | |
|---|---|
| $I_{i,\,d}^{g\text{-}cl}$ | Index set of edges entering crosslink receive group i |
| $I_{i,\,u}^{g\text{-}cl}$ | Index set of edges entering crosslink send group i |
| $A_{node}^{g\text{-}cl}$ | Crosslink group constraint matrix using the node formulation |
| $A_{edge}^{g\text{-}cl}$ | Crosslink group constraint matrix using the edge formulation |
| $A^{g\text{-}cl}$ | One of $A_{nofr}^{g\text{-}cl}$ or $A_{edge}^{g\text{-}cl}$ |

Table 7 shows group constraint parameters.

TABLE 7

| | |
|---|---|
| $I_i^{g\text{-}v}$ | Index set of edges entering visit group i |
| $n_i^v$ | The maximum number of visits allowed to group i |
| $n_v$ | Vector of all $n_i^v$ $n_v = [n_1^V \ldots n_{n_{g-v}}^V]^T$ |
| $A^{g\text{-}v}$ | Visit group constraint matrix |

Table 8 shows indices and index mappings.

TABLE 8

| | |
|---|---|
| i; j | General indices into matrices and sets |
| l | Satellite index |
| k | Discrete time index |

Table 9 shows other variables.

TABLE 9

| | |
|---|---|
| $x_i$ | Binary variable on whether or not to select node i |
| $y_i$ | Amount of data on board (not a notion of agent) |
| $d_i$ | Penalty on data at node i |
| $\alpha$ | Weighting on data |
| $S_{dl}$ | Set of nodes corresponding to a downlink |
| $\tilde{\alpha}_i$ | Heuristic for the opportunity cost associated with downlink node i |
| $\tilde{c}_i$ | Heuristic sum of possible data downlinked and the possible data |
| $\tilde{b}_i$ | Heuristic for the amount of data that could be obtained if node l is not chosen |

Figure 2B:
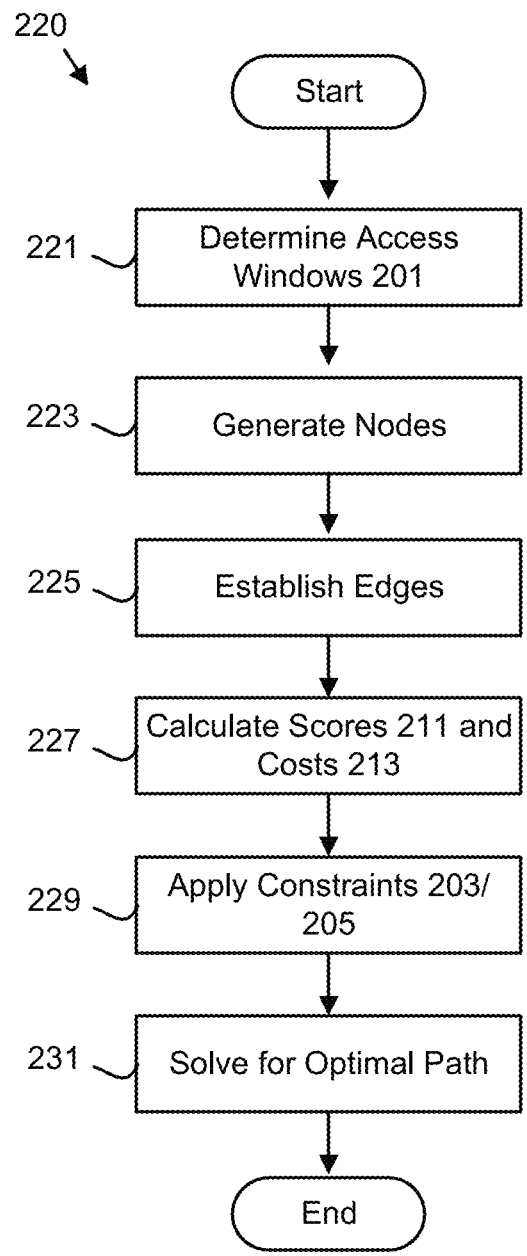
FIG. 2B is a schematic flow chart diagram of one embodiment of task graph creation.

FIG. 2B is a schematic ow chart diagram of a method 220 for task graph creation and MILP formulation. The method 200 may be used to plan a mission for the satellite constellation 109. The task graph is further described in FIG. 3A.

The method 220 starts and determines 221 access windows 201 for satellites 100 to communicate with other satellites 100 and ground stations 117 and/or gather data from targets 115. The access windows 201 may be determined 221 by solving a communication graph as will be described hereafter.

A task graph is formulated directly from the access windows 201 by generating 223 task nodes. Each access window 201, imaging task starting position, and ending position is represented as a task node. In one embodiment, backbone nodes are generated 223. Each backbone node may be separated from each other backbone node by a worst-case maneuver time interval that forms a backbone window.

The method 220 further establishes 225 edges between the task nodes. Each backbone node may be connected to each access task node within a backbone window for the backbone node. An edge may be subject to a maximum number of group nodes N and a maximum number of total nodes K. Each task node may be connected to a next backbone node within a maximum slew time interval. The maximum slew time interval may be the time for a 180 degree slew at the maximum slew rate 21.

The method 200 calculates 227 scores 211 and costs 213 and applies 229 the temporal constraints 203 and/or spatial constraints 205 to the task graph as will be described hereafter.

The method 500 further solves 231 the task graph for an optimal path 217 and the method 200 ends. The optimal path 217 may specify communication and data collection tasks. The task graph may be solved by solving a corresponding MILP problem 215.

In one embodiment, the access windows 201 are discretized, providing discrete points in time for which a particular satellite 100 may access each target 115, communicate with another satellite 100, and/or communicate with a ground station 117. Nodes in the task graph are formed from these discrete points in time as well as the starting and ending position of the satellite 100. Additional nodes, referred to as backbone nodes, are also added to ensure connectivity of the task graph. These backbone nodes are separated in time such that a worst-case slew maneuver can be performed within the maximum slew time interval. The nodes (or vertices) may be numbered from 1 to $n_v$ with node i denoted as $v_i$. The set of all nodes is defined as V. Associated with each node is a time value, a satellite position, and a desired orientation of the satellite 100 as shown in FIG. 3A.

Figure 3A:
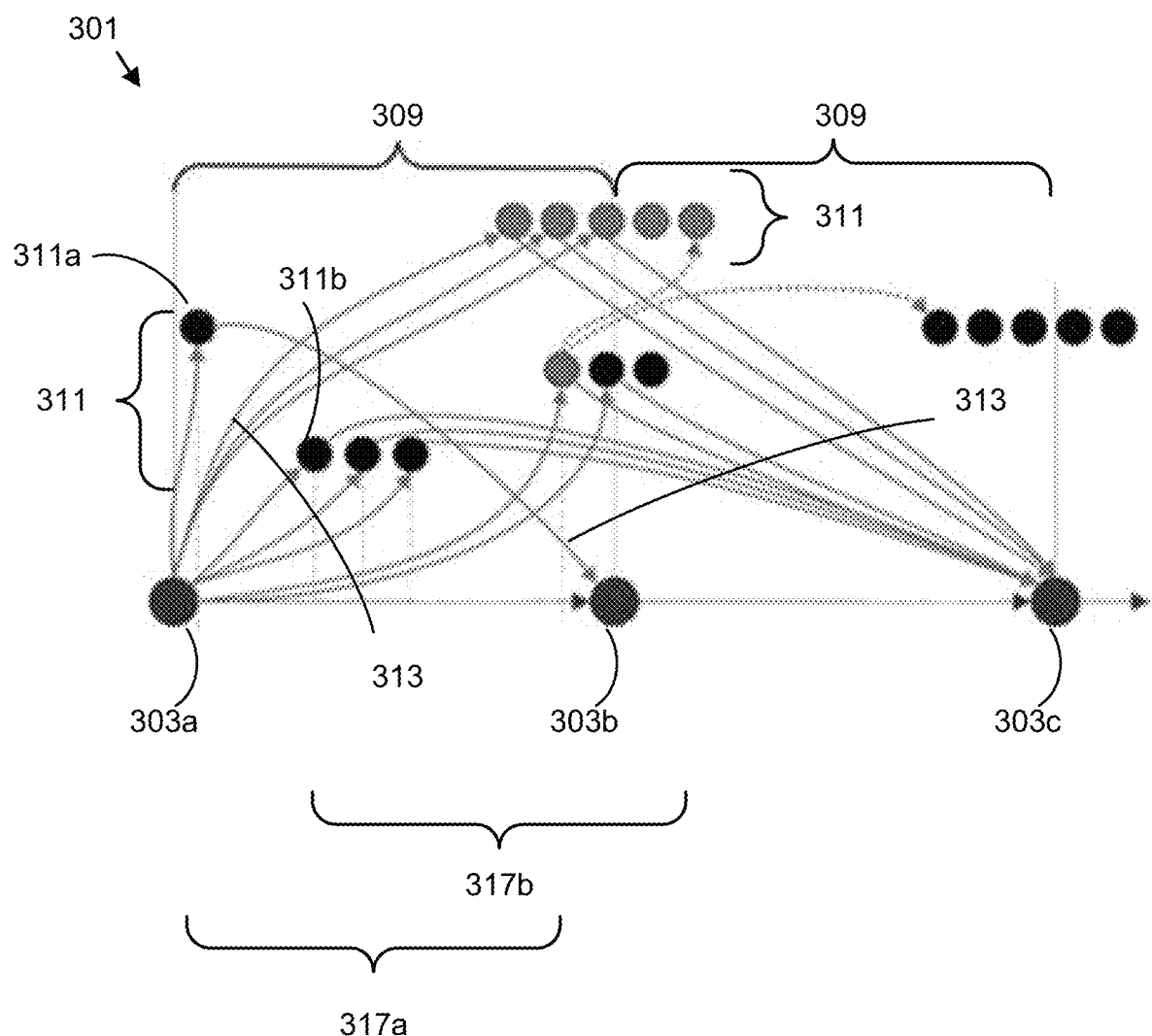
FIG. 3A is a drawing illustrating one embodiment of a task graph.

FIG. 3A is a drawing illustrating one embodiment of a task graph 301. The task graph 301 includes backbone nodes 303 and task nodes 311. A task node 311 may be a communication task node 311. The communication task node 311 may be within an access window 201 received from a communication graph as will be described hereafter. The task graph 301 may be used to determine a target layer. The task nodes 311 are connected with edges 313 by binning task nodes 311 within the backbone window 309 established by the backbone nodes 303. The edges are established by starting with the first backbone node 303a and connecting the first backbone node 303a to all task nodes 311 within the backbone window 309. This ensures connectivity from the backbone node 303 to all available task nodes 311 within each backbone window 309. Each task node 311 is connected to the backbone node 303 that exists after the maximum slew time interval 317. To illustrate this, a first task node 311a is connected to backbone node 303b since the maximum slew time interval 317a ends before backbone node 303b. Conversely, a second task node 311b connects to backbone node 303c since the maximum slew time interval 317b ends in the subsequent backbone window 309. If the maximum slew time interval 317 matches the backbone node separation time, then each task node 311 will be connected to the backbone node 303 at the end of the subsequent backbone window 309.

Additional constraints are available to manage graph complexity. For example, each task node 311 may be only allowed to connect to a maximum number of subsequent task nodes 311 per group and a maximum total number of task nodes 311. A group is a collection of task nodes 311 pertaining to a single access window 201 for either a communication or imaging operation. These constraints are specified by the parameters N and K The value for N represents the maximum number of task nodes 311, within a particular group, that any task node 311 is allowed to connect to while K represents the maximum number of total nodes 311 a single task node 311 can connect to. These parameters help to trade the complexity of the task graph 301 with the optimality of the future solution. Allowing N and K to be infinite, results in a fully connected task graph 301 in that each task node 311 will connect to every other subsequent task node 311 if enough time exists to perform a transition between the task nodes 311. Conversely, setting N and K to very small numbers reduce the complexity of the task graph 301.

In FIG. 3A, N is set to one (one node per group) and K is set to two (two total nodes). These parameters may be modified to trade graph complexity for solution optimality. This is followed for each backbone node 303 present within the planning horizon and results in the final task graph 301 to be considered. Once the task nodes 311 and edges 313 have been determined, a score 211 is determined for each task node 311 based on the value of performing the task of data collection and the like. The score 211 is then assigned to the edge 313 that connects to that task node 313. A score 213 is also assigned to each edge 313 that represents a downlink operation. Conversely, a cost 213 is assessed to the transition between task nodes 311 based upon the slew that must be performed. The score 211 and cost 213 of each edge 313 is combined into an edge utility denoted as $u_i$. As the edge utility defines an edge preference, an optimization problem can be formulated to choose which edges 313 to maximize overall utility.

The task graph 301 is used to generate the MILP problem 215. A flow constraint may be created to ensure that the chosen path moves naturally from one node to another along edges of the task graph 301. As each target 115 may be represented in a number of different task nodes 311, a coordination constraint is added on groups of task nodes 311 to ensure that each target 115 is imaged only once by the satellite constellation 109. Finally, a linear constraint is developed to represent the data levels onboard each satellite 100. The matrix form of these constraints is presented herein.

The variables of optimization include a binary variable for each edge, $x_i$, denoting whether or not the solution uses edge i. The vector x combines all $x_i$ values. The optimization variables also include the data onboard each satellite for each time step. The data for satellite l at time k is denoted as $y_{l,k}$ with the aggregate vector of all data values represented as y. The MILP formulation can be described by $$\max_z u^T z$$

subject to constraints.

$$\max_z u^T z \quad (1)$$

s.t.

$$Dx = b \text{(flow)}$$

$$A_g x \leq \mathbb{1}_{n_g} \text{(Coordination)}$$

$$A_{data} z = b_{data} \text{(Data)}$$

-continued $$x_i \in \{0,1\} \forall_i$$

$$0 \le y_{l,k} \le y_{l,max} \forall\, l, k$$

$$z = [x^T y^T]^T$$

A solution to the MILP problem in 215 provides a balance between image collection and data downlinking, with the satellites 100 having a limit to the amount of data that is allowed to stay onboard. However, it is often the case that a satellite 100 will not have direct communication with a ground station 117 for some time after the data has been collected. Thus, to facilitate the timely delivery of data, a crosslink capability between satellites 100 is introduced. This allows one satellite 100 to communicate its onboard data to another satellite 100, which can then subsequently communicate the data to a ground station 103.

Crosslink operations require two satellites 100 to perform a single crosslink task since both satellites 100 must have their respective crosslink antennas pointed at each other at the same time during the operation. A potential crosslink is represented in the task graph 301 through a combination of four task nodes 311, two for each satellite 100 in the crosslink. Each of the two satellites 100 will have the ability to transmit to or receive from the other satellite 100. While there are four task nodes 311, the task nodes 311 must form part of the chosen path in one of two combinations: if a transmit task node 311 is selected from one satellite 100, then the corresponding receive task node 311 for the other satellite 100 must be chosen and vice versa. Additionally, the transmit and receive task nodes 311 of a single satellite 100 cannot be simultaneously chosen. Note that there is no need to add a constraint for the latter condition as both task nodes 311 occur at the same point in time, and the flow constraint will naturally disallow both nodes 311 being chosen as part of the path.

Figure 3B:
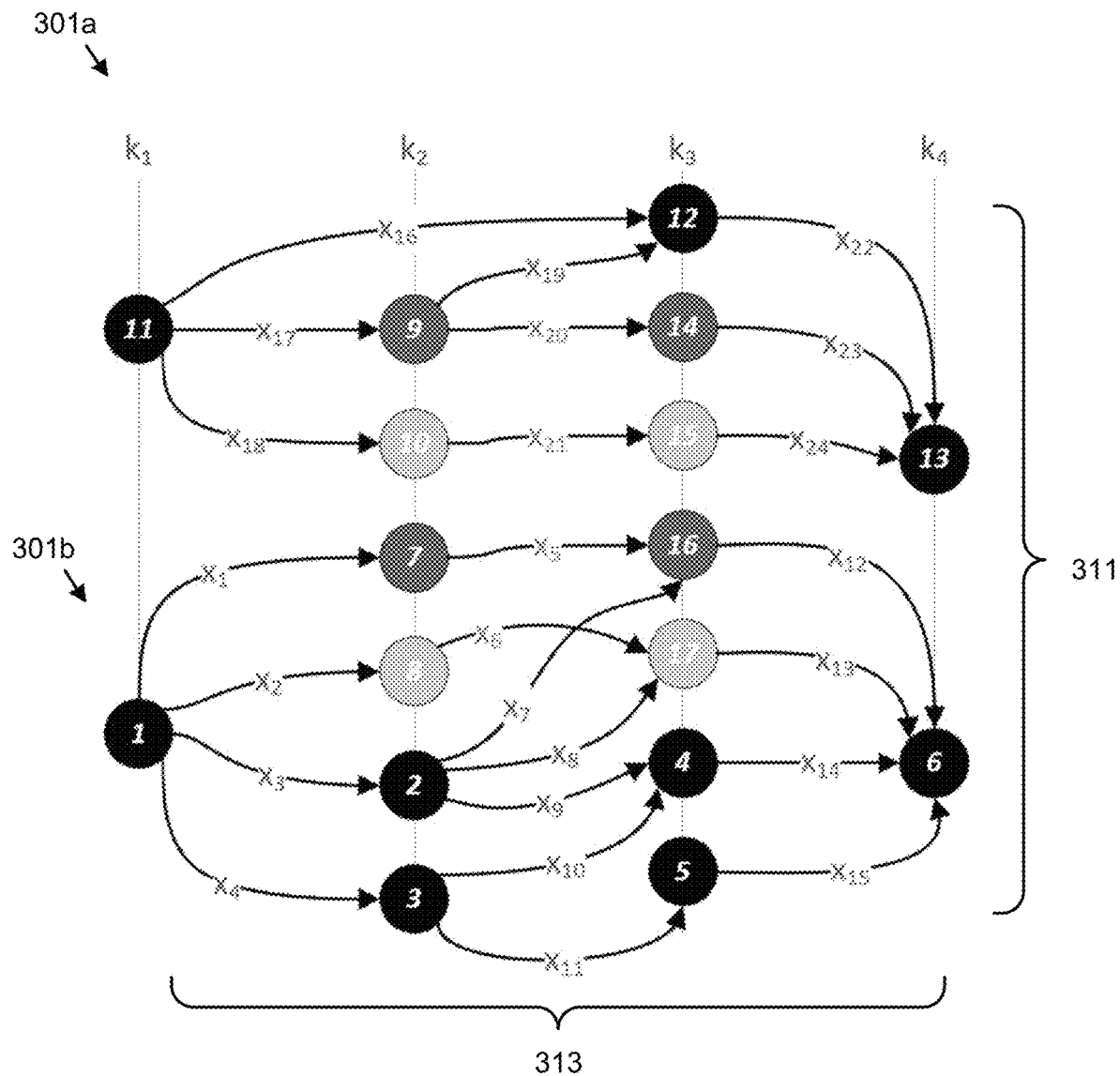
FIG. 3B is a drawing illustrating one embodiment of task graphs.

Consider the two task graphs 301a-b shown in FIG. 3B. For clarity, task nodes 311 are circles with numbers and edges 313 are lines. Imaging task nodes 311 are labeled 1, 2, 3, 4, 5, 6, 11, 12, and 13, transmit communication task nodes 311 are labeled 8, 17, 10, and 15 and receive communication task nodes 311 are labeled 7, 16, 9, and 14 and represent transmit and receive crosslink tasks. Time steps are labeled from k1 to k4. The dynamic memory variables for the task graphs 301a-b are represented in Table 10.

TABLE 10

| Node # | Memory |
|---|---|
| 1 | Initial B |
| 2 | 10 |
| 3 | 10 |
| 4 | 10 |
| 5 | 20 |
| 6 | 0 |
| 7 | 30 |
| 8 | −50 |
| 9 | 50 |
| 10 | −50 |
| 11 | Initial A |
| 12 | 10 |
| 13 | 0 |
| 14 | 50 |
| 15 | −50 |
| 16 | 50 |
| 17 | −50 |

The receive task nodes 311 increase the memory on a satellite 100 since it will receive the data from its neighbor while the transmit task nodes 311 are associated with a negative memory amount since the satellite 100 will transmit the data to its neighbor. This allows the memory to be properly accounted for across the satellite constellation 109. The crosslink formalization is now presented followed by a simple example.

Crosslink communications occur if one satellite 100 has subsequent transmit task nodes 311 connected by an edge 313, and the other satellite 100 has subsequent receive task nodes 311 connected by an edge 313 at the same time. This principle allows the balancing of incoming edges 313 to be ignored. In fact, a chosen path can pass through a crosslink task node 311 without the corresponding opposite task node 311 for the other satellite 100 being chosen as long as the chosen path does not pass between subsequent crosslink task nodes 311. Thus, the crosslink groups are formed as edge pairs, i.e., an edge between subsequent receive task nodes 311 and an edge 313 between transmit task nodes 311 at the same time. The constraint matrix can now be formulated as:

$$A_{edge}^{g-cl} = [a_{ij}^{g-cl}] = \begin{cases} 1 & \text{Edge } j \text{ is receive for group } i \\ -1 & \text{Edge } j \text{ is transmit for group } i \\ 0 & \text{Otherwise} \end{cases} \quad (2)$$

In one embodiment, Equation (1) is subject to $A_{edge}^{g-cl}=0$. Allowing $A^{g-cl}$ to equal either $A_{node}^{g-cl}$ or $A_{edge}^{g-cl}$, so the MILP problem 215 including crosslink may be expressed as $$\max_z u^T z \quad (3)$$

s.t.

$$Dx = b(\text{flow})$$

$$A_g x \le \mathbb{1}_{n_g}(\text{Coordination})$$

$$A_{data} z = b_{data}(\text{Data})$$

$$A^{g-cl} x = 0(\text{Crosslink})$$

$$x_i \in \{0,1\} \forall_i$$

$$0 \le y_{l,k} \le y_{l,max} \forall\, l, k$$

$$z = [x^T y^T]^T$$

A simple example is now provided to illustrate the concept using the task graphs 301 in FIG. 3B. The group constraint must be applied to ensure both the transmit and receive operations occur together. For example, the task graphs 301 illustrate the required groupings. For the edges between time steps k2 and k3, edges 20 and 6 form a group, and edges 21 and 5 form another separate group. This grouping constraint ensures that the transmit and receive pairings occur together appropriately. These constraints are captured as an edge matrix 321 as shown in FIG. 3C.

The task graphs 301 are set up to allow for either data collection or communication operations. Note that the initial memory values assigned to each satellite shown in Table 11 will have a direct impact on the paths chosen by the optimization routine. Two demonstrations are provided to illustrate the concept.

TABLE 11

| Time Step | Sat A Memory | Sat B Memory |
|---|---|---|
| k1 | 0 GB | 0 GB |
| k2 | 0 GB | 10 GB |
| k3 | 10 GB | 30 GB |
| k4 | 10 GB | 30 GB |

In one embodiment, consider the scenario where both satellite A 100 (initial node 11) and satellite B 100 (initial node 1) start the mission planning process with a completely empty onboard memory that is capable of storing up to 200 GB. No memory is consumed yet when starting from the initial graph node (1), and imaging opportunities are available for fulfillment as illustrated in FIG. 3B. Solving the optimal path 217 through the task graphs 301 results in the paths ($x_{16}$, $x_{22}$) and ($x_4$, $x_{11}$, $x_{15}$). The corresponding stored data amounts, at each time step, are shown in Table 11. Note that the satellite operations match the selected path and never approach the limit of 200 GB.

In another scenario with the same task graph 301, but the onboard data recorder is initially at 80 GB on satellite A 100 and 200 GB on satellite B 100. With these initial conditions, satellite B 100 is unable to follow the same route from the previous example due to the data storage constraints. To alleviate the situation, satellite B 100 must transmit data to satellite A 100, and satellite A 100 must receive the data. Solving the MILP problem 215 finds the paths ($x_{17}$, $x_{20}$, $x_{23}$) and ($x_2$, $x_6$, $x_{13}$) in FIG. 3B. The corresponding data storage at each time step is shown in Table 12.

TABLE 12

| Time Step | Sat A Memory | Sat B Memory |
|---|---|---|
| k1 | 80 GB | 200 GB |
| k2 | 80 GB | 200 GB |
| k3 | 130 GB | 150 GB |
| k4 | 130 GB | 150 GB |

Note that the data constraint is respected, and that both satellites 100 cooperate to ensure that the memory limits are not violated. This exemplary solution provides a means to solve the cross-schedule dependency MILP problem 215 when using crosslinking in the context of constellation planning. In one embodiment, a downlink optimization MILP problem 215 is defined as:

$$\min_{xi} \sum_{i \in S_{dl}} (\tilde{c}_i x_i + \alpha d_i y_i) \quad (4)$$

s.t.

$$x_i \in \{0,1\}$$

$$y_i \in \mathbb{R}$$

$$y_i \geq 0$$

$$y_i \geq y_{i-1} - \tilde{a}_i x_i + \tilde{b}_i$$

Wherein $i \in S_{dl}$ restricts the optimization to downlink task nodes 311, $\tilde{c}_i x_i$ is the opportunity cost of selecting the ith downlink task node 311, and $\alpha d_i y_i$ is a data penalty for task node i. In one embodiment, the $y_i \geq y_{i-1} - \tilde{a}_i x_i + \tilde{b}_i$ constraint describes data as a function of a previous task node 311 and a decision whether to collect data at the current task node 311. In one embodiment, opportunities are sorted by time. In addition, the MILP problem 215 may be formulated for a single agent $y_i$.

Figure 3D:
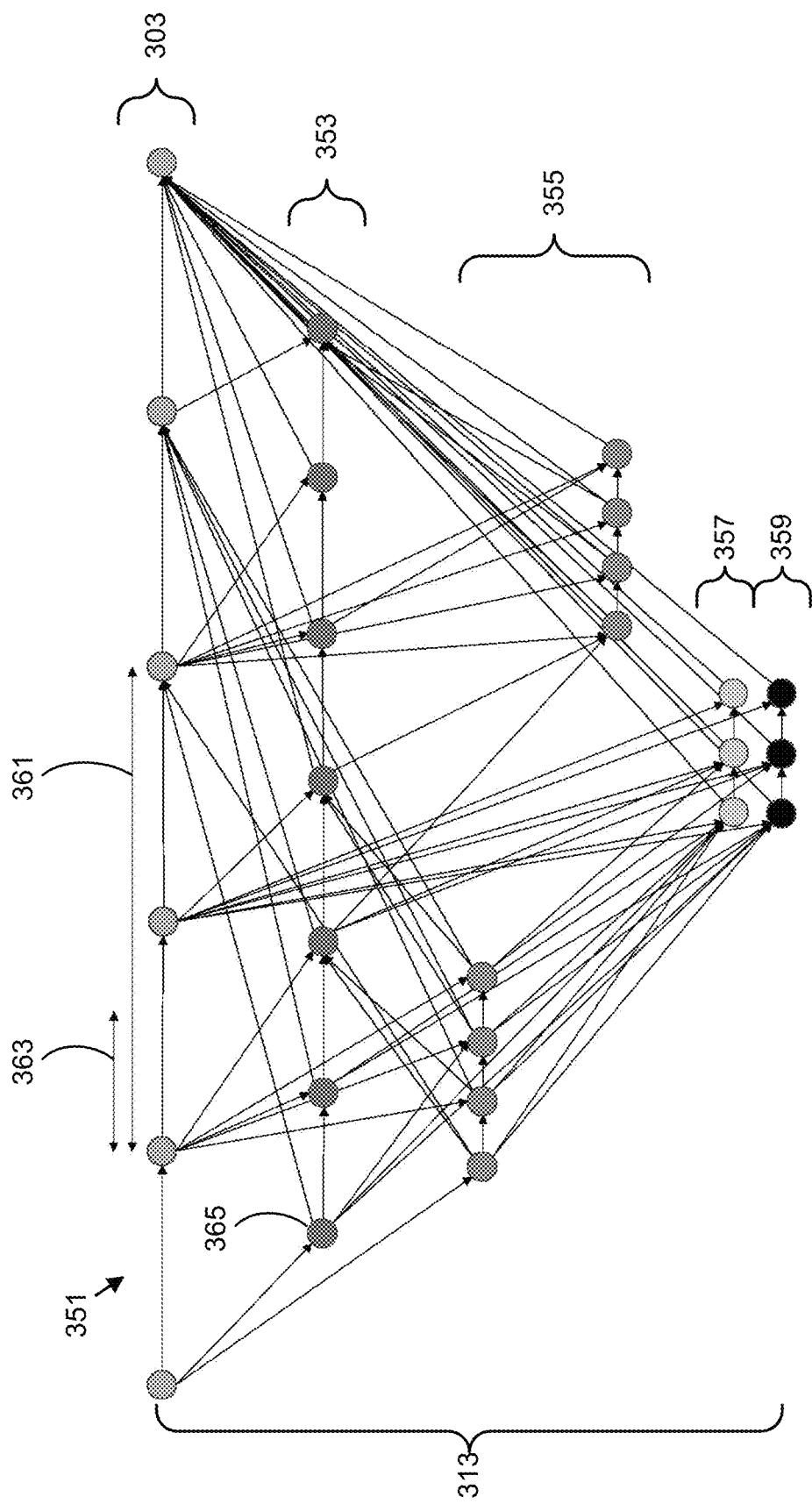
FIG. 3D is a drawing of one embodiment of a communication graph.

FIG. 3D is a drawing of a communication graph 351. The communication graph 315 may be used to optimize for downlink data transfers to the ground station 117 and/or crosslink communications based on a minimum task time 363 and a minimum backbone time 361. In one embodiment, the minimum backbone time 361 is the time required for a 180 degree slew by the satellite 100. The communication graph 351 includes:

Backbone nodes 303 that correspond to the satellite 100 not performing another task and are used generally for maintaining connectivity in the graph. Edges 313 between subsequent backbone nodes 303 have zero edge utility and zero data acquired.

Data collection nodes 353 that correspond to the satellite collecting data. Edges 313 between subsequent data collection nodes 353 have positive edge utility and positive data acquired.

Downlink nodes 355 that correspond to the satellite 100 downlinking data to a ground station 117. Downlink nodes 355 have positive e d g e utility and negative data acquired.

Crosslink-transmit nodes 357 that correspond to the satellite 100 communicating data to another satellite 100. Crosslink-transmit nodes 357 have non-positive edge utility and a negative data acquired.

Crosslink-receive nodes 359 that correspond to the satellite receiving data from another satellite. They have non-positive edge utility and a positive data acquired.

The edges 313 are shown as lines between nodes 303/353/355/357/359 and are of two types. Homogeneous edges 313 transition between two nodes 303/353/355/357/359 of the same type. The edge utility and data acquired are described with the nodes 303/353/355/357/359. There may be a line graph of homogeneous nodes 303/353/355/357/359 for each group of subsequent nodes 303/353/355/357/359 of the same type (i.e., edges 313 will not "skip over" nodes 303/353/355/357/359).

In addition, transition edges 313 transition between nodes 303/353/355/357/359 of different types. Transition edges 313 correspond to the satellite 100 shifting activities, e.g., transition from the backbone node 303 to a downlink node 355. Transition edges 313 can be further divided into transitions edges 313 to/from backbone nodes 303 and transition edges 313 between the remaining node types.

In one embodiment, backbone nodes 303 are spaced evenly throughout the communication graph 351. The transitions among backbone nodes 303 form a line graph from beginning to end. A node 353/355/357/359 that is not a backbone node 303 may connect to the first backbone node 303 that is after a maximum slew time, $t_{slew,max}$, corresponding to the time it takes to slew a given number of degrees. Note that a slew between any two nodes 303/353/355/357/359 will be less than 180°. The backbone nodes 303 provide a worst-case scenario, allowing edges with time length longer than $t_{slew,max}$ to be ignored. To provide connectivity, a first backbone node 303 is connected to the following backbone node 303 as well as every other node 353/355/357/359 with a time value between the first backbone node 303 and the following backbone node 303 for the satellite 100.

Other nodes 353/355/357/359 may fall at any arbitrary time throughout the communication graph 351. A transition between two nodes 303/353/355/357/359 of different types is present if the second node 303/353/355/357/359 is at least a given amount of time after the first node 303/353/355/

357/359, upper-bounded by $t_{slew,max}$, and the second node 303/353/355/357/359 is the next node 303/353/355/357/359 of its type with a time greater than or equal to the first node 303/353/355/357/359. The reason for the upper bound is that the first node 303/353/355/357/359 can indirectly connect to any node 303/353/355/357/359 further than $t_{slew,max}$ using backbone nodes 303. In one embodiment, a dummy node 365 is added.

The structure of this communication graph 351 is less complex than a full graph. By only considering transitions between nodes 303/353/355/357/359 within a time window (as opposed to considering transitions from a node 303/353/355/357/359 to all following nodes 303/353/355/357/359), less transitions are added to the communication graph 351. Furthermore, backbone nodes 303 and data collection nodes 353 are spaced out in the communication graph 351, reducing the number of nodes 303/353/355/357/359 (and thus resulting transitions) in a time window. The drawback of this less complex graph is that some possible paths are sacrificed. For example, if nodes 303/353/355/357/359 of different types are close together, no transition is considered, even if slew constraints would have allowed one. The main benefit of the sacrifice of optimality is a rapid calculation of a communication plan.

Another advantage of this formulation is the ability to create a visit constraint on the downlink nodes 355 and crosslink nodes 357/359. To avoid oscillating between communication links and data collections, it may be desirable to have satellites 100 crosslink at most onetime per crosslink opportunity and be limited in the number of times satellites 100 can downlink in a downlink opportunity.

In one embodiment, a constraint for the combination matrix 351 is defined as $A^{g-v} x \leq n_v$ and the MILP problem 215 is defined as:

$$\max_z u^T z \quad (5)$$

s.t.

$$Dx = b(\text{flow})$$

$$A_{data} z = b_{data}(\text{Data})$$

$$A^{g-cl} x = 0(\text{Crosslink})$$

$$A^{g-v} x \leq n^v (\text{Revisit Restriction})$$

$$x_i \in \{0,1\}$$

In one embodiment, the MILP problem 215 considers downloading files of data in a timely manner. The MILP problem 215 is defined as:

$$\max_z u^T z \quad (6)$$

s.t.

$$A_{cap} x \leq b_{cap}(\text{Window Capacity})$$

$$A_{tran} x \leq b_{tran}(\text{Transfer Route Limit})$$

$$A_{seq} x \leq 0(\text{Revisit Restriction})$$

$$x_i \in \{0,1\}$$

In one embodiment, the MILP problem 215 may be subject to constraints selected from both (5) and (6).

The embodiments yield a communication plan and/or access windows 201 for each satellite 100, providing times for downlinking and/or crosslinking, referred to hereafter has a communication layer. The results of the communication layer including the access windows 201 may be added to a target layer such as the task graph 301 to complete planning. The target layer's purpose may be to acquire imagery data, providing data to communicate. In one embodiment, only that the communication nodes 355/357/359 are added to the task graph 301 as communication task nodes 311 where the communication nodes 355/357/359 occur in the communication plan. In addition, edges 313 may pruned around the communication nodes 355/357/359, forcing the task graph 301 to search to find a path through the planned communication nodes 355/357/359. A dummy communication node 365 may be added to the end of every communication graph 351 or task graph 301 to allow for paths that do not downlink or crosslink as much data as the communication plan dictated.

The edges 313 between nodes 303/353/355/357/359 in the communication graph 351 may be generated in two steps. The first step determines what edges 313 may potentially be valid, and the second step checks that the maximum slew rate 219 allows that edge 313. The potentially valid edges 313 between target nodes 303/353/355/357/359 are defined as any edge 313 between a node 303/353/355/357/359 and a later node 303/353/355/357/359, as long as there is not a backbone node 303 or a communication node 355/357/359 between them. There is a potential edge 313 from every target node 303/353/355/357/359 and the backbone node 303 or communication node 355/357/359 following the target node 353/355/357/359. Every backbone node 303 connects to all of the target nodes 353/355/357/359 that are between the target node 353/355/357/359 and the next backbone node 303 or communication node 355/357/359, as well as the next backbone node 303 or communication node 355/357/359. Additionally, each communication node 355/357/359 may connect to the dummy node 365 in its window. Each dummy node 365 may connect to all of the target nodes 303/353/355/357/359 between the dummy node 365 and the next backbone node 303 or communication node 355/357/359, including the next backbone 303 or communication node 355/357/359.

Each of these potential edges 303 is then checked for slew feasibility before being added to the communication graph 351. This may result in a communication graph 351 that alternates between regions of relatively dense edges 313 and regions of sparse edges 313. The dense regions occur between communication windows where the planner must select the imaging tasks. The sparse regions occur during communication windows where the only edges 313 that occur are between communication nodes 355/357/359 and backbone nodes 303.

Figure 4:
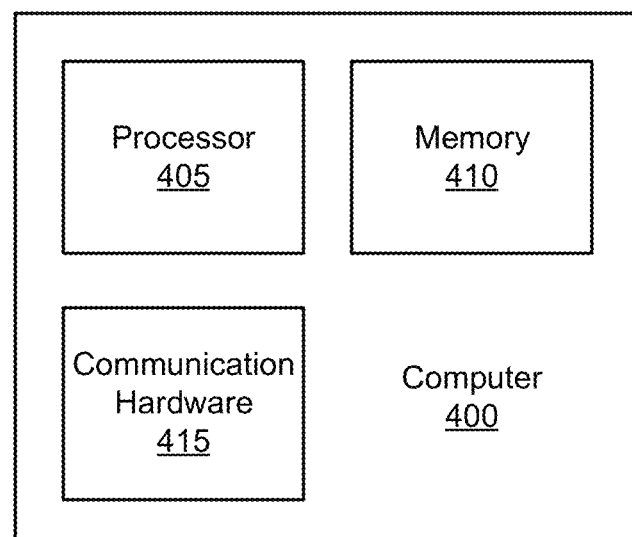
FIG. 4 is a schematic block diagram illustrating one embodiment of a computer.

FIG. 4 is a schematic block diagram illustrating one embodiment of a computer 400. The computer 400 may calculate a mission plan for the satellite constellation 109. The computer 400 may be embodied in the satellite 100. In addition, the computer 400 may be in remote communication with the satellite 100. In the depicted embodiment, the computer 400 includes a processor 405, a memory 410, and communication hardware 415. The memory 410 may store code. The processor 405 may execute the code. The communication hardware 415 may communicate with other devices.

Figure 5:
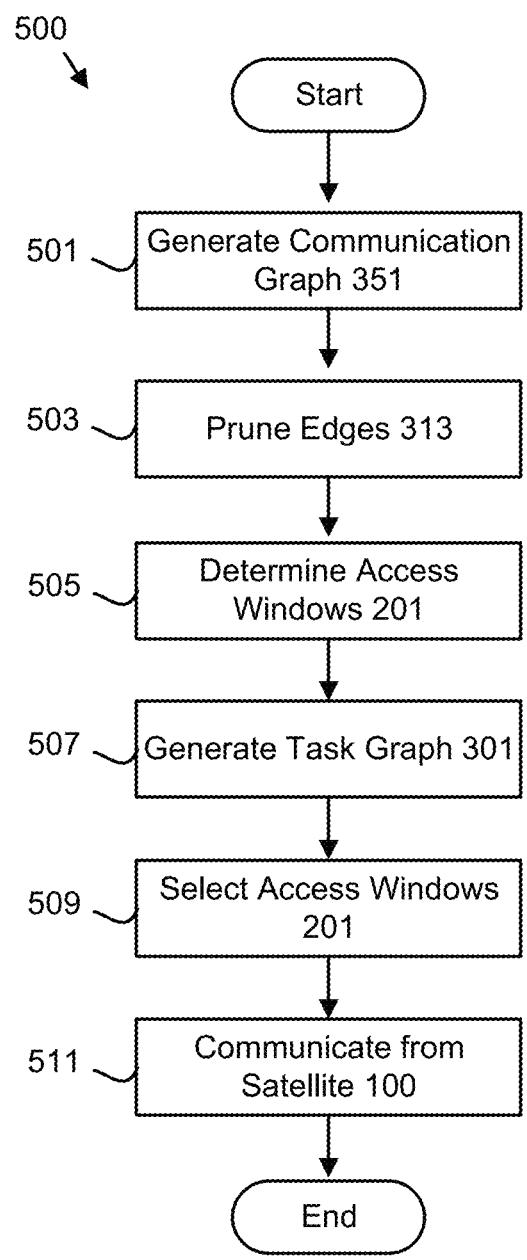
FIG. 5 is a schematic flow chart diagram illustrating one embodiment of a communication method.

FIG. 5 is a schematic flow chart diagram of a communication method 500. The method 500 determines access windows 201 and communicate using the access windows 201. The access windows may be shared with the task graph 301 of FIG. 3A.

The method 500 starts and generates 501 the communication graph 351. The communication graph 351 may include the backbone nodes 303, dummy nodes 365, data collection nodes 353, downlink nodes 355, crosslink-transmit nodes 357, and crosslink-receive nodes 359, wherein the backbone nodes 303, the data collection nodes 353, the downlink nodes 355, the crosslink-transmit nodes 357, and the crosslink-receive nodes 359 are connected by one of a homogenous edge 313 between nodes of a same type and transition edges 313 between nodes of a different type. In one embodiment, the nodes 303/353/355/357/359 are received from the task graph 301 and/or the MILP problem 215 solution for the task graph 301.

The method 500 may prune 503 edges 313 from the communication graph 351. The method 500 may prune 503 edges 313 not supported by a slew rate. In addition, edges 313 between a first node 303/353/355/357/359 and a second node 303/353/355/357/359 with an intervening backbone node 303 may be pruned 503.

The method 500 may determine 505 access windows 201. The access windows 201 may be determined 505 from the communication graph 351. The access windows 201 may be determined 505 by solving the MILP problem 215 for the communication graph 351. The method 500 may further generate 507 the task graph 301 as described in FIG. 2B. The access windows 201 may be added to the task graph 301 as communication task nodes 311.

The method 500 may select 509 access windows 201 and/or corresponding communication task nodes 311 based on the task graph 301. The access windows 201 and/or corresponding communication task nodes 311 may be selected by solving the MILP program 215 for the task graph 301. In addition, the given satellite 100 may communicate 511 with the selected access window 201.

The embodiments simplify mission planning for a satellite constellation 109. As a result, the efficiency of a computer 400 selecting the access windows 201 is improved.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
generating a communication graph comprising backbone nodes, dummy nodes, data collection nodes, downlink nodes, crosslink send nodes, and crosslink receive nodes, wherein the backbone nodes, the data collection nodes, the downlink nodes, the crosslink-transmit nodes, and the crosslink-receive nodes are connected by one of a homogenous edge between nodes of a same type and transition edges between nodes of a different type;
determining access windows for downlink communications and crosslink communications using the communication graph, wherein each access window comprises a temporal constraint defining a time interval for performing a given downlink communication and a spatial constraint for performing the given communication;
generating task nodes for a task graph from the access windows and imaging task, wherein each access window, imaging task starting position, and ending position is represented as a task node;
establishing edges by connecting each task node to a feasible subsequent task node with an edge subject to a maximum number of group nodes and a maximum number of total nodes;
calculating a score and cost for each task mode and edge based on an imaging task value;
applying constraints;
solving for an optimal path for the access windows;
selecting access windows based on the task graph generated from the communication graph; and
communicating from a given satellite within the selected access windows.

2. The method of claim 1, wherein the spatial constraints comprise azimuth angle restrictions and sun elevation angle constraints.

3. The method of claim 1, the method further comprising calculating an edge utility for each edge.

4. The method of claim 1, wherein the communication graph is generated in response to a first satellite having a crosslink-transmit node and a second satellite having a crosslink-receive node connected by an edge.

5. The method of claim 1, wherein the communication graph is subject to a memory status of the first satellite and the second satellite.

6. The method of claim 1, the method further comprising:
pruning edges from the communication graph not supported by a slew rate; and
pruning edges from the communication graph between a first node and a second node with an intervening backbone node.

7. An apparatus comprising:
a processor executing code stored on a memory to perform:
generating a communication graph comprising backbone nodes, dummy nodes, data collection nodes, downlink nodes, crosslink send nodes, and crosslink receive nodes, wherein the backbone nodes, the data collection nodes, the downlink nodes, the crosslink-transmit nodes, and the crosslink-receive nodes are connected by one of a homogenous edge between nodes of a same type and transition edges between nodes of a different type;
determining access windows for downlink communications and crosslink communications using the communication graph, wherein each access window comprises a temporal constraint defining a time interval for performing a given downlink communication and a spatial constraint for performing the given communication;
generating task nodes for a task graph from the access windows and imaging task, wherein each access window, imaging task starting position, and ending position is represented as a task mode;
establishing edges by connecting each task node to a feasible subsequent task node with an edge subject to a maximum number of group nodes and a maximum number of total nodes;
calculating a score and cost for each task node and edge based on an imaging task value;
applying constraints;
solving for an optimal path for the access windows;
selecting access windows based on the task graph generated from the communication graph; and
communicating from a given satellite within the selected access windows.

8. The apparatus of claim 7, wherein the spatial constraints comprise azimuth angle restrictions and sun elevation angle constraints.

9. The apparatus of claim 7, the processor further calculating an edge utility for each edge.

10. The apparatus of claim 7, wherein the communication graph is generated in response to a first satellite having a crosslink-transmit node and a second satellite having a crosslink-receive node connected by an edge.

11. The apparatus of claim 7, wherein the communication graph is subject to a memory status of the first satellite and the second satellite.

12. The apparatus of claim 7, the processor further performing:
pruning edges from the communication graph not supported by a slew rate; and
pruning edges from the communication graph between a first node and a second node with an intervening backbone node.

13. A computer program product comprising a non-transitory storage medium storing code executable by a processor to perform:
generating a communication graph comprising backbone nodes, dummy nodes, data collection nodes, downlink nodes, crosslink send nodes, and crosslink receive nodes, wherein the backbone nodes, the data collection nodes, the downlink nodes, the crosslink-transmit nodes, and the crosslink-receive nodes are connected by one of a homogenous edge between nodes of a same type and transition edges between nodes of a different type;
determining access windows for downlink communications and crosslink communications using the communication graph, wherein each access window comprises a temporal constraint defining a time interval for performing a given downlink communication and a spatial constraint for performing be given communication;
generating task nodes for a task graph from the access windows and imaging task, wherein each access window, imaging task starting position, and ending position is represented as a task mode;
establishing edges by connecting each task node to a feasible subsequent task node with an edge subject to a maximum number of group nodes and a maximum number of total nodes;
calculating a score and cost for each task node and edge based on an imaging task valve;
applying constraints;
solving for an optimal path for the access windows;
selecting access windows based on the task graph generated from the communication graph; and
communicating from a given satellite within the selected access windows.

14. The computer program product of claim 13, wherein the spatial constraints comprise azimuth angle restrictions and sun elevation angle constraints.

15. The computer program product of claim 13, the processor further calculating an edge utility for each edge.

16. The computer program product of claim 13, wherein the communication graph is generated in response to a first satellite having a crosslink-transmit node and a second satellite having a crosslink-receive node connected by an edge.

17. The computer program product of claim 13, wherein the communication graph is subject to a memory status of the first satellite and the second satellite.

* * * * *